Aug. 11, 1925. 1,549,697
C. C. WHITTAKER ET AL
CONTROLLER
Filed Oct. 7, 1921 3 Sheets-Sheet 3

WITNESSES:
Albert G. Schiefelbein
H. C. Lowe

INVENTORS
Charles C. Whittaker and
Donald C. West.
BY
Eberley G. Carr
ATTORNEY

Patented Aug. 11, 1925.

1,549,697

UNITED STATES PATENT OFFICE.

CHARLES C. WHITTAKER AND DONALD C. WEST, OF PITTSBURGH, PENNSYLVANIA, ASSIGNORS TO WESTINGHOUSE ELECTRIC AND MANUFACTURING COMPANY, A CORPORATION OF PENNSYLVANIA.

CONTROLLER.

Application filed October 7, 1921. Serial No. 506,173.

*To all whom it may concern:*

Be it known that we, CHARLES C. WHITTAKER, a citizen of the United States, and a resident of Pittsburgh, in the county of Allegheny and State of Pennsylvania, and DONALD C. WEST, a citizen of the United States, and a resident of Pittsburgh, in the county of Allegheny and State of Pennsylvania, have invented a new and useful Improvement in Controllers, of which the following is a specification.

Our invention relates to controllers and it has particular relation to master controllers for governing a plurality of motors in a control system, such, for example, as would be required for electric locomotives.

One object of our invention is to provide a controller for governing a plurality of motors that shall be simple, compact and economical in construction and reliable and positive in operation.

Another object of our invention is to provide means for so interlocking a plurality of drums of a controller that any one of the drums may be independently actuated or the drums may be actuated simultaneously.

Still another object of our invention is to provide interlocking means for preventing improper operation of the master reverser when any one of the controller drums occupies an operating position.

A further object of our invention is to provide a controller having means for accelerating groups of motors simultaneously and means for adjusting the resistance in circuit with any particular group of motors to secure more uniform distribution of the load upon the motors.

Briefly speaking, our invention consists in so constructing a controller having a plurality of rotatably mounted drums that the drums may be independently actuated by means of separate handles or they may be simultaneously actuated by means of a single handle.

For a better understanding of our invention, reference may be made to the accompanying drawings, Figure 1 of which is a view, partly in side elevation and partly in section, of a master controller designed in accordance with our invention;

Figure 1:
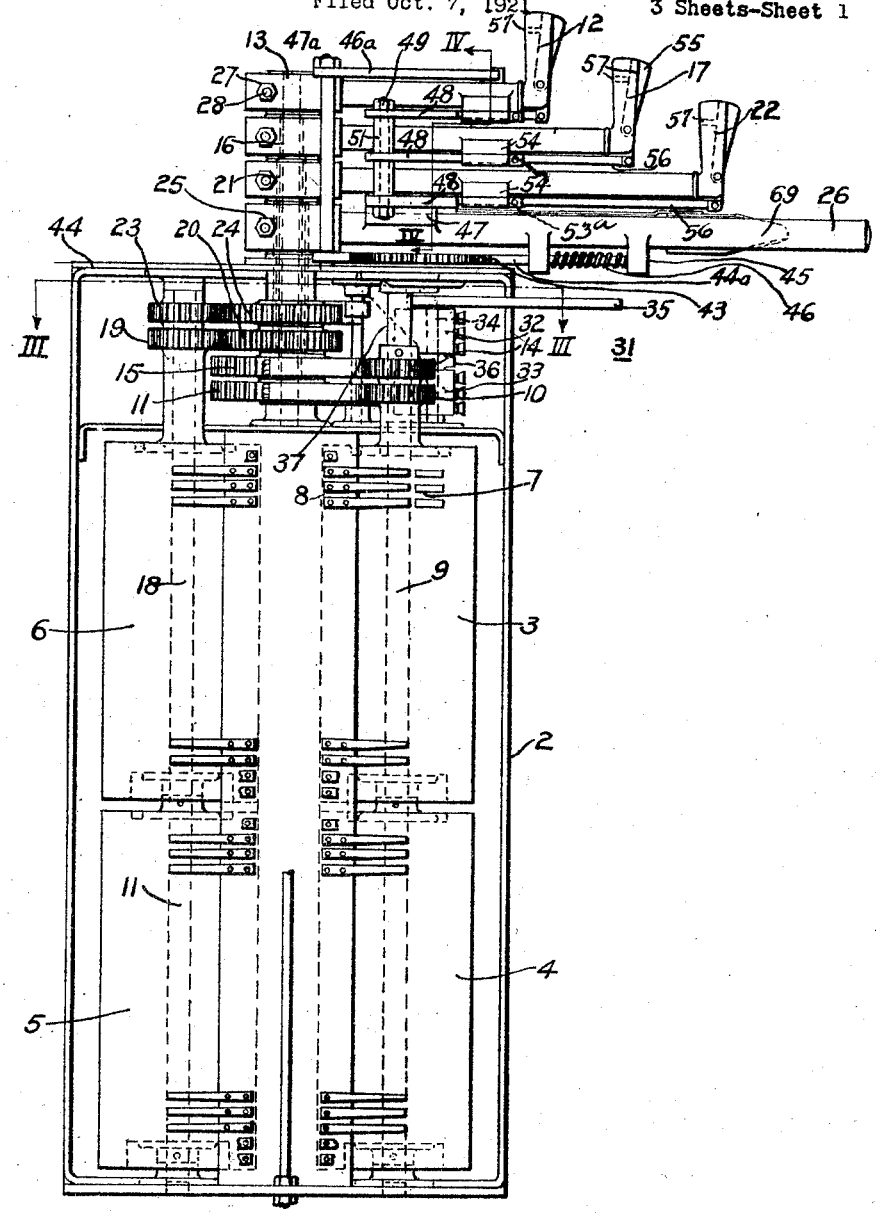
Figure 2:
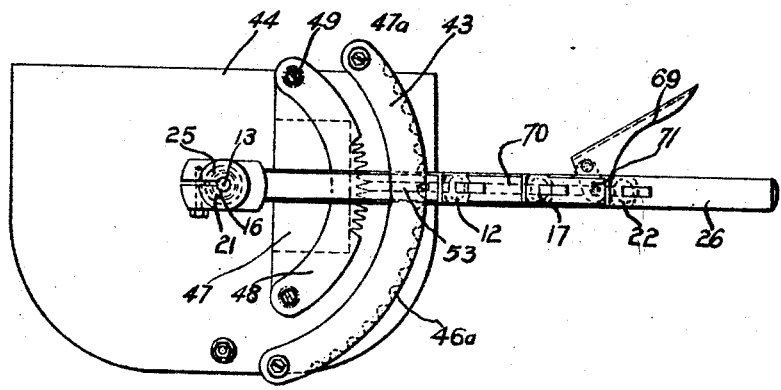
Fig. 2 is a plan view of the master controller illustrated in Fig. 1.
Figure 3:
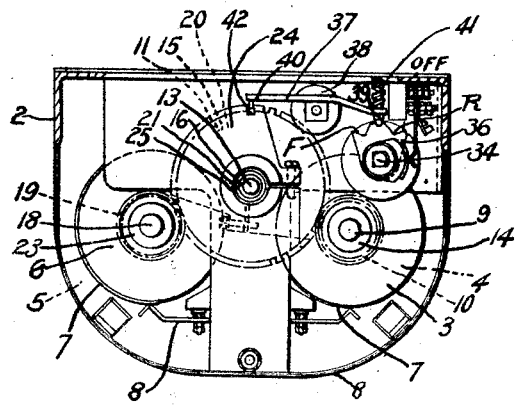
Fig. 3 is a cross-sectional view, taken along the line III—III of Fig. 1.

Referring particularly to Figs. 1, 2 and 3 of the drawing, a master controller 1 is provided with a frame 2, in which is mounted a plurality of drums 3 to 6, inclusive. The drums 3 to 6, inclusive, are provided with a plurality of contact segments 7, which are adapted to engage a plurality of sets of control fingers 8. The drum 3 is rotatably mounted upon a suitably journalled vertical shaft 9 and is attached to a pinion 10 which meshes with a gear segment 11. The segment 11 may be actuated by a handle 12 which occupies the uppermost position of all the operating handles, the segment being mechanically connected to the handle 12 by means of a shaft 13.

The drum 4 is secured to the shaft 9 to be rotated thereby. A pinion 14, which is secured to the shaft 9, may be actuated by a gear segment 15. The segment 15 is secured to a hollow shaft 16 which is mechanically connected to a handle 17, this handle being mounted next in order below the handle 12. The tubular shaft 16 is rotatably mounted upon the shaft 13.

The drum 6, which is rotatably mounted upon the shaft 18, is secured to a pinion 19 which is adapted to be actuated by a segmental gear 20. The segmental gear 20 is mechanically connected to a tubular shaft 21 which is rotatably mounted upon the tubular shaft 16. The tubular shaft 21 is mechanically connected to the handle 22 which is located in a plane below the handle 17 and is adapted to actuate the shaft 21.

The drum 5 is secured to the shaft 18 which may be actuated by the pinion 23. The pinion 23 is adapted to be actuated by the segmental gear 24 which is securely mounted upon a tubular shaft 25. The tubular shaft 25 is rotatably mounted upon the shaft 21 and may be actuated by the lowermost handle 26.

The handles 12, 17, 22 and 26 are preferably secured to the corresponding shafts 13, 16, 21 and 25 by means of individual clamping members 27 and bolts 28.

The manner in which the shafts 16, 21 and 25 are concentrically mounted upon the shaft 13 may be readily understood by referring to Fig. 2 of the drawing.

A master reverser 31 comprises a plurality of drums 32 and 33 which are securely mounted upon a shaft 34. The shaft 34 may be actuated by the reverser handle 35. A cam member 36 is securely mounted upon the shaft 34 between the drums 32 and 33. The cam member has a plurality of indentations corresponding to forward and reverse positions of the master reverser, marked F and R, respectively and an intermediate or "off" position.

An interlocking member 37 is pivotally mounted upon a stud 38 and is provided with projections 39 and 40 at its extremities (see Fig. 3). The projection 39 is adapted to engage the indentations marked F, R and "Off" of the cam member 36 and is maintained in engagement with the cam member by means of a resilient member or spring 41.

The projection 40 of the interlocking member 37, which is of sufficient depth to be capable of engaging all four segmental gears 11, 15, 20 and 24, is adapted to fit into openings 42 thereof. When the controller drums 3 to 6, inclusive, are in their "off" positions, the openings 42 of the segmental gears 11, 15, 20 and 24 are located in vertical alinement and occupy the positions illustrated in Fig. 3 of the drawings, in which positions, the projection 40 of the interlocking member 37 is adapted to enter all four openings 42.

If any one of the controller drums 3 to 6, inclusive, occupies an operative position, the corresponding opening 42 will not be in the position illustrated in Fig. 3, and the interlocking member 37 may not be actuated in a counter-clockwise direction. The interlocking member 37 and its projections 39 and 40 are so designed that the master reverser may be actuated through the "off" position only when the speed drums 3 to 6, inclusive, are in their "off" positions. Moreover, the interlocking member 37 makes it impossible to actuate the speed drums 3 to 6, inclusive, from their "off" positions if the master reverser 31 occupies its "off" position. By means of this interlocking between the master reverser and the speed drums, it is impossible for improper circuits to be formed in the control system.

Referring particularly to Figs. 1 and 2 of the drawing, a guide-bar 43 is securely mounted upon an upper cover member 44 which is attached to the frame 2 of the controller 1. A pin 44a, which is slidably mounted in projections 45 constituting parts of the handle 26, is biased into engagement with the guide-bar 43 by means of a resilient member or spring 46. The guide-bar 43 and the pin 44a serve to prevent the handle 26 from occupying positions intermediate the controller notches. An arcuate member 46a, which is secured to the member 43 by bolts 47a, is provided for indicating the positions of the drums 3 to 6, inclusive.

Figure 4:
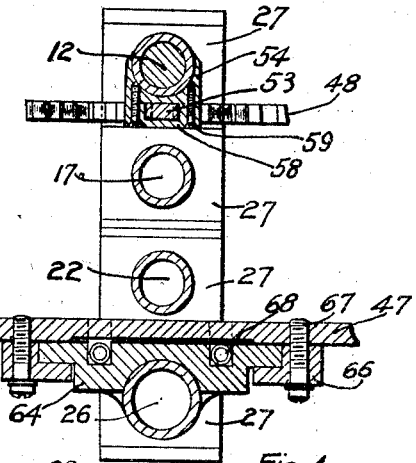
Fig. 4 is a view, partly in end elevation and partly in section, taken along the line IV—IV of Fig. 1, of the handles and interlocking mechanism illustrated in Fig. 1.
Figure 5:
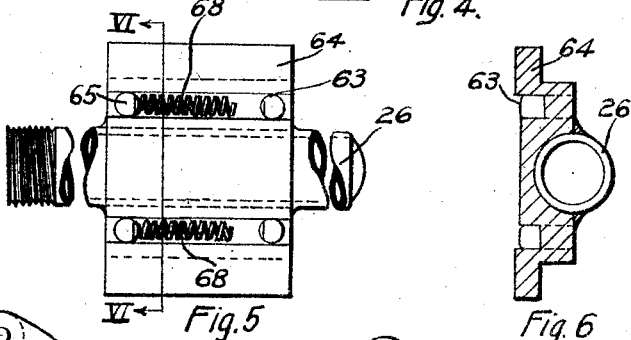
Fig. 5 is a plan view of a portion of one of the handles illustrated in Fig. 1 of the drawing.
Figure 6:
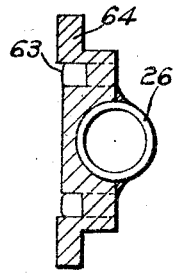
Fig. 6 is a cross-sectional view taken along the line VI—VI of Fig. 5.
Figure 7:
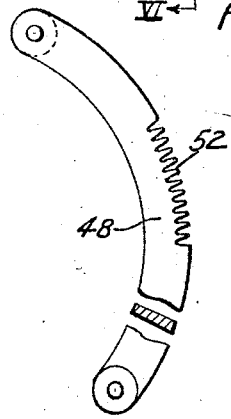
Fig. 7 is a plan view, partly in section, of one of the interlocking members illustrated in Fig. 1 of the drawing.
Figure 8:
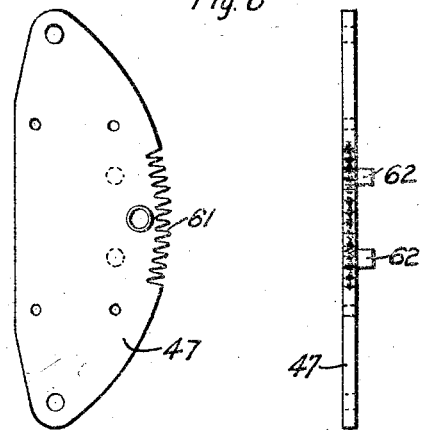
Figs. 8 and 9 are views, in plan and in side elevation, respectively, of an interlocking member illustrated in Fig. 1 of the drawing.
Figure 9:
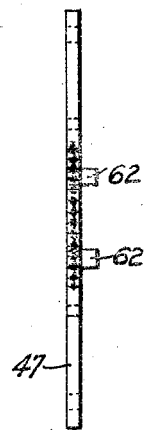

A movable interlocking member 47, illustrated in detail in Figs. 4, 8 and 9, is slidably mounted upon the handle 26, in a manner hereinafter described. A plurality of arcuate rack members 48, which are illustrated in detail in Fig. 7 of the drawings, are mechanically secured to the movable member 47 by means of bolts 49. The arcuate members 48 are uniformly spaced by means of the tubular members or sleeves 51 which are mounted upon the bolts 49.

The arcuate members 48 are provided with teeth 52 which are normally engaged by latch pins 53. The latch pins 53 are slidably mounted in blocks 54 which constitute parts of the handles 12, 17 and 22, as is best illustrated in Fig. 4 of the drawings. The pins 53 are mechanically connected, by means of rods 56, to latching members 55 which are pivotally mounted upon the handles 12, 17 and 22. The latching members 55 are biased to the positions illustrated in the drawings by means of resilient members 57 which are mounted in each of the handles 12, 17 and 22. The handles 12, 17 and 22 may be released by applying pressure upon the latching members 55 to effect outward movement of the pins 53.

The pins 53 are slidably mounted in the blocks 54 which constitute integral parts of the handles 12, 17 and 22, by means of flat members 58 and screws 59, as is illustrated in Fig. 4 of the drawings.

For a better understanding of the construction of the movable interlocking member 47, reference may be made to Figs. 4, 5, 6, 8 and 9 of the drawing. The movable member 47 is a flat arcuate member provided with a plurality of teeth 61, which are engaged by the movable pin 53 in the handle 22, and with a plurality of pins 62. The pins 62 are so spaced and designed that they are adapted to move in grooves 63 of a projecting portion 64 of the handle 26. Movement of the member 47 is limited by stops or studs 65 which are rigidly positioned within the slots 63 and may engage the corresponding pins 62. The movable member 47 is clamped on the projecting portion 64 of the handle 26 by means of L-shaped members 66 which are secured thereto by means of bolts 67, as is best illustrated in Fig. 4 of the drawing. Springs 68 are provided for biasing the movable member 47 to its outer position, thereby bringing the notches 52 and 61 of the movable members 48 and 47, respectively, into engagement with the pins 53 which are mounted upon the handles 12, 17 and 22.

The movable member 47 may be actuated toward the shaft 13 of the controller 1 by means of a pivotally mounted handle or latching member 69 and a rod 70 which is mechanically connected to the handle 69 by means of a pin 71. The simultaneous operation of the controller drums may be effected by actuating the controller handle 26 without moving the latching member 69.

Under these conditions, the handles 12, 17 and 22 will be actuated by the handle 26, as they are mechanically connected through the movable member 47, arcuate members 48 and pins 53. If it is considered desirable to accelerate or decelerate one of the motors separately, the latching member 55 of the corresponding one of the handles 12, 17 and 22 may be actuated inwardly prior to moving the particular handle. When the latching member 55 is moved inwardly, the pin 53 is withdrawn from engagement with the corresponding arcuate member 48, or 47, and that particular controller handle is free to move.

If it is desirable to independently accelerate the motor that is governed by the drum 5, the operator, by actuating the latching member 69 prior to movement of the handle 26, will cause the movable member 47, and hence the arcuate members 48, to move inwardly towards the shaft 13. Therefore, all the arcuate members 48 will be disengaged from their corresponding latching pins 53. The pins 53 are provided with suitable stops 53a to prevent their following up the movement of the members 47 and 48 toward the shaft 13.

From the above description, it is apparent that we have provided means whereby a plurality of controller drums may be independently actuated by separate handles or they may be simultaneously actuated by means of mechanical interlocking when one of the handles is actuated, regardless of their relative angular positions.

While we have shown our invention in the preferred form, it is apparent that minor modifications in the arrangement and structure of the controller may be made without departing from the spirit thereof. We desire, therefore, to be limited only by the scope of the appended claims.

We claim as our invention:

1. In a controller, in combination, a plurality of rotatable controller drums, a plurality of operating handles for the drums, means cooperative to effect the setting of a selected operating handle in different predetermined positions and means for locking the other operating handles in any predetermined relation to said selected operating handle.

2. In a controller, the combination with a plurality of drums, and means comprising a plurality of handles for independently actuating said drums, of a member slidably mounted upon one of said handles, means attached to said handle for actuating said member, and interlocking means associated with the remainder of said handles and governed by said member for securing simultaneous operation of said drums.

3. In a controller, in combination, a plurality of rotatable controller drums, a plurality of operating handles for the drums, means cooperative to effect the setting of a selected operating handle in different predetermined positions, means for locking the other operating handles in any predetermined relation to said selected operating handle and means disposed on said selected handle operative to effect its release from the other operating handles.

4. In a controller, in combination, a plurality of rotatable controller drums, a plurality of operating handles for the drums, means cooperative to effect the setting of a selected operating handle in different predetermined positions, means for locking the other operating handles in any predetermined relation to said selected operating handle, means disposed on said selected handle operative to effect its release from the other operating handles and means associated with each of the handles, other than the selected operating handle, for effecting their individual release from all of the other handles to permit independent operation.

5. In a controller, the combination with a plurality of drums, and means comprising a plurality of handles for actuating said drums, of an interlocking member movably mounted upon one of said handles, means for biasing said member to an operative position, means for actuating said member to an inoperative position, and means comprising a member mounted upon said first member for mechanically connecting said first member to another of said handles.

6. In a controller, the combination with a plurality of drums, and means comprising a plurality of handles for independently actuating said drums, of a plurality of members securely connected together, means for movably mounting said members upon one of said handles, and means associated with another of said handles for normally engaging one of said members.

7. In a controller, in combination, a plurality of rotatable controller drums, a plurality of operating handles for the drums, means cooperative to effect the setting of a selected operating handle in different predetermined positions, means for locking the other operating handle in any predetermined relation to said selected operating handles and means associated with each of the handles for effecting their individual release from all of the other handles to permit independent operation.

8. In a controller, in combination, a plurality of rotatable controller drums, a plurality of operating handles for the drums, means cooperative to effect the setting of a selected operating handle in different predetermined positions, means for locking the other operating handles in any predetermined relation to said selected operating handle, a reversing drum and means cooperative to prevent the operation of said reversing drum unless said control drums are in a predetermined position.

9. In a controller, in combination, a plurality of rotatable controller drums, a plurality of operating handles for the drums, means cooperative to effect the setting of a selected operating handle in different predetermined positions, means for locking the other operating handles in any predetermined relation to said selected operating handle, a reversing drum and means cooperative to prevent the operation of said reversing drum unless said control drums are in predetermined positions, said means being adapted to prevent the operation of the control drums when the reversing drum is in an "off" position.

10. In a controller, in combination, a plurality of rotatable controller drums, a plurality of operating handles for the drums, means cooperative to effect the setting of a selected operating handle in different predetermined positions, means for locking the other operating handles in any predetermined relation to said selected operating handle, means disposed on said selected handle operative to effect its release from the other operating handles, means associated with each of the handles, other than the selected handle, for effecting their individual release to permit independent operation, a reversing drum and means cooperative to prevent the operation of said reversing drum unless said control drums are in predetermined positions, said means being adapted to prevent the operation of the control drums when the reversing drum is in an "off" position.

11. In a controller, in combination, a plurality of rotatable control drums, a plurality of operating handles for said drums, trains of gears interposed between said operating handles and the respective drums, means cooperative to effect the setting of a selected operating handle in different predetermined positions, a movably-mounted rack-and-latch mechanism cooperative to lock the other handles in predetermined positions relative to the selected handle and latch-releasing means for effecting the individual release of said other handles and means for shifting the rack members to effect the release of the selected handle.

12. In a controller, in combination, a plurality of drums, a plurality of operating handles for the drums, a latch-receiving member carried by a selected drum-operating handle, latches carried by the other handles disposed to engage the latch-receiving member to lock all the handles in any predetermined relation, and means provided on said other handles to operate the latches to release the handles individually.

13. In a controller, in combination, a plurality of drums, a plurality of operating handles for the drums, a latch-receiving member carried by a selected drum-operating handle, latches carried by the other handles disposed to engage the latch-receiving member to lock all the handles in any predetermined relation and means provided on said other handles to operate the latches to release the handles individually, said latch-receiving member being slidably mounted thereby to permit its movement to release all of the operating handles.

In testimony whereof, we have hereunto subscribed our names this 19th day of September, 1921.

CHARLES C. WHITTAKER.
DONALD C. WEST.